United States Patent
Burmann et al.

(10) Patent No.: US 6,701,377 B2
(45) Date of Patent: Mar. 2, 2004

(54) AUTOMATION SYSTEM AND CONNECTING APPARATUS FOR COMMUNICATION BETWEEN TWO NETWORKS THAT USE TWO DIFFERENT PROTOCOLS WITH CONVERSION BETWEEN TCP/IP AND PCP

(75) Inventors: Christof Burmann, Olsberg (DE); Jurgen Matthias, Rodenberg (DE); Roland Bent, Detmold (DE); Karl-Josef Beine, Borgentreich (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 09/145,848

(22) Filed: Sep. 2, 1998

(65) Prior Publication Data
US 2002/0042845 A1 Apr. 11, 2002

(30) Foreign Application Priority Data
Sep. 8, 1997 (DE) .......................... 197 39 297

(51) Int. Cl.⁷ .............................. G06F 15/16
(52) U.S. Cl. ................. 709/249; 709/230; 709/236; 709/249; 710/4; 710/104; 370/395
(58) Field of Search ............................... 709/230, 236, 709/249; 370/395; 710/4, 104

(56) References Cited

U.S. PATENT DOCUMENTS

| | | | | |
|---|---|---|---|---|
| 5,509,121 A | * | 4/1996 | Nakata et al. | |
| 5,566,170 A | * | 10/1996 | Bakke et al. | |
| 5,706,434 A | * | 1/1998 | Kremen et al. | |
| 5,710,908 A | * | 1/1998 | Man | |
| 5,787,248 A | * | 7/1998 | Zupcsics et al. | 709/230 |
| 5,907,610 A | * | 5/1999 | Onweller | |
| 5,913,164 A | * | 6/1999 | Pawa et al. | |
| 6,003,088 A | * | 12/1999 | Houston et al. | 709/230 |
| 6,016,318 A | * | 1/2000 | Tomoike | |
| 6,026,088 A | * | 2/2000 | Rostoker et al. | 370/395 |
| 6,032,147 A | * | 2/2000 | Williams et al. | |
| 6,044,382 A | * | 3/2000 | Martino | |
| 6,084,859 A | * | 7/2000 | Ratcliff et al. | |
| 6,199,104 B1 | * | 3/2001 | Delph | |
| 6,272,151 B1 | * | 8/2001 | Gupta et al. | |
| 2001/0039615 A1 | * | 11/2001 | Bowker et al. | |

* cited by examiner

*Primary Examiner*—Le Hein Luu
*Assistant Examiner*—Stephan Willett
(74) *Attorney, Agent, or Firm*—Charles E. Baxley

(57) ABSTRACT

The invention concerns a heterogeneous automation system (10) including a first physical network (15, 17, 20) in which all connected devices can communicate on the basis of a first communication protocol and at least one second physical network (52, 58, 59; 54, 56, 57, 60) which is connected to the first network (15, 17, 20) by way of a first control device (25, 30) functioning as a gateway, and in which all devices (54, 56, 57, 60) connected thereto can communicate on the basis of a second communication protocol, wherein the first and second networks and the first and second communication protocols are different.

The object of the present invention is to provide a system and a connecting apparatus, by means of which communication is simplified, in particular upon start-up, configuration and maintenance of the system, in the entire automation system.

The invention attains that object in that each first control device (25; 30) has a logic interface for the substantially transparent communication between at least one device connected to the first network (17) and at least one device connected to the second network (52; 54), on the basis of the first communication protocol.

9 Claims, 4 Drawing Sheets

AUTOMATION SYSTEM AND CONNECTING APPARATUS FOR COMMUNICATION BETWEEN TWO NETWORKS THAT USE TWO DIFFERENT PROTOCOLS WITH CONVERSION BETWEEN TCP/IP AND PCP

CROSS REFERENCE TO RELATED APPLICATIONS

The instant application is a second CPA of application Ser. No. 09/145,848, filed Sep. 2, 1998, and entitled Automation System and Connecting Apparatus for the Transparent Communication Between Two Networks, and to be expressly abandoned after the instant application is accorded a filing date.

FIELD OF THE INVENTION

The invention concerns an automatic system as set forth in the classifying portion of claim 1 and a connecting apparatus as set forth in the classifying portion of claims 13 and 14.

DESCRIPTION OF THE RELATED ART

Heterogeneous automation systems are known, including a routing or master network, for example the Ethernet, and a plurality of field buses which are subordinate to the routing network, for example an InterBus-S. The connection of a field bus to the Ethernet is by way of so-called gateways. The items of equipment connected to the Ethernet communicate with each other by way of the TCP/IP-protocol while the items of equipment connected to the field buses can each use respectively different communication protocols. It will be noted however that the known gateways are not capable of permitting a transparent communication between the items of equipment connected to the Ethernet and the items of equipment connected to the subordinate field buses, by way of the TCP/IP-protocol.

BRIEF SUMMARY OF THE INVENTION

Therefore the object of the present invention is to provide a system and a connecting apparatus, by means of which communication is simplified, in particular upon start-up, configuration and maintenance of the system, in the entire automation system.

A control device including a gateway is recited in further K independent claims 13 and 14.

BRIEF DESCRIPTION OF SEVERAL VIEWS OF THE DRAWINGS

The invention is described in greater detail hereinafter by means of the specific embodiments with reference to the drawings in which.

DETAILED DESCRIPTION OF THE INVENTION

Figure 1:
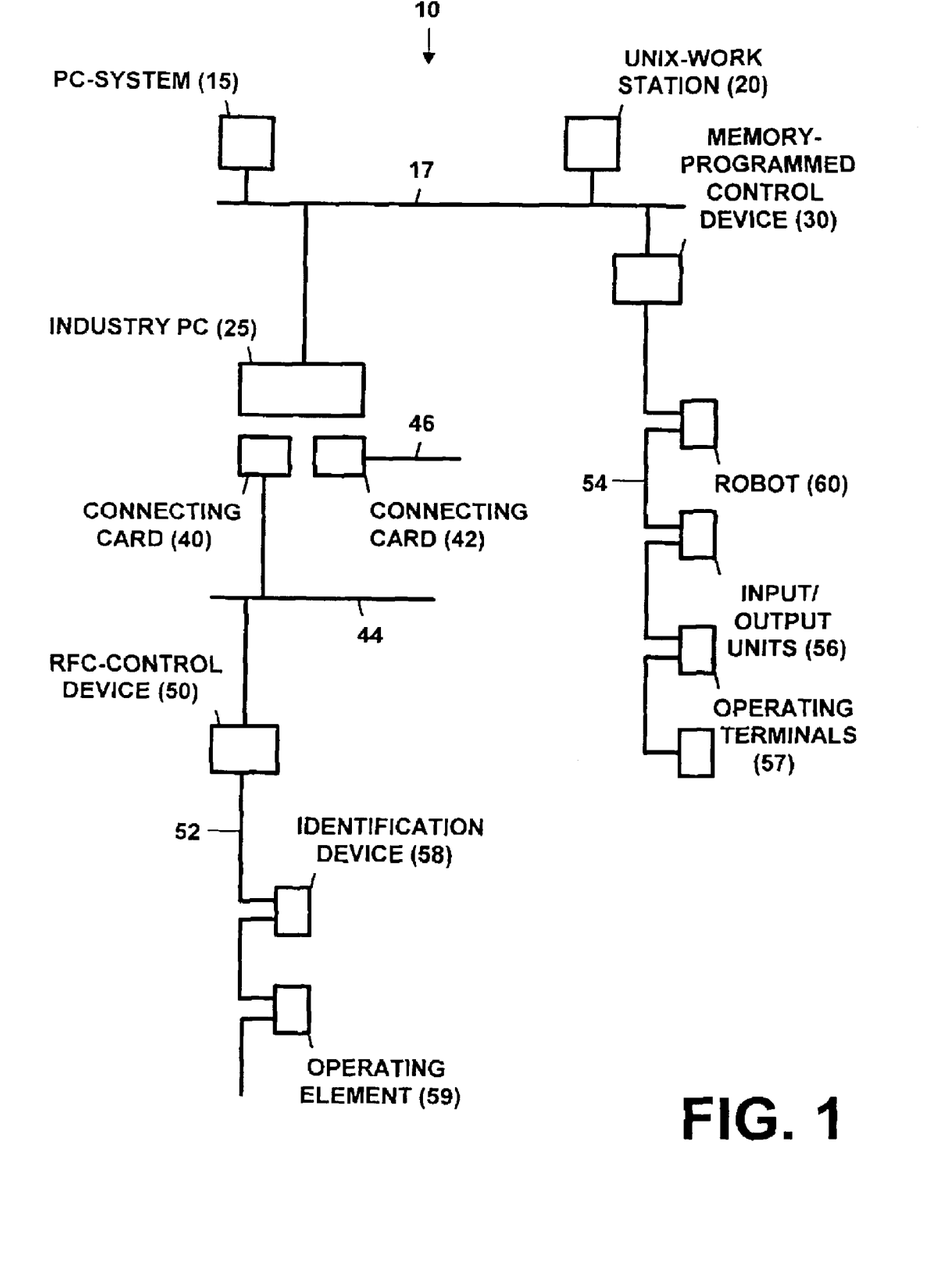
FIG. 1 shows the structure in principle of a heterogeneous automation system in which the invention is embodied.

The structure of a heterogeneous automation system 10 is shown in simplified form in FIG. 1. Connected to a higher-order network, in our example the Ethernet 17, are a PC-system 15 and a for example UNIX-work station 20, each by way of a respective Ethernet connection. In addition, an industry-PC 25 and a memory-programmed control device 30, a so-called connecting unit, are connected to the Ethernet 17, which involve a gateway functionality. Fitted into the PC 25 are for example two connecting cards 40, 42 which connect a field bus 44 and 46 respectively to the Ethernet 17. The field bus is for example the InterBus-S. An RFC (Remote Field Control)-control device 50 which also has a gateway functionality connects the interbus 44 to a further interbus 52. The connecting unit 30 connects a further interbus 54 to the Ethernet 17. It should be noted that any number of field buses can be connected to each other or to the Ethernet 17. Besides input/output units 56, identification systems 54 and also operating terminals 57 with simple visualization options and a robot 60 are connected to the interbus 54. For example an identification device 58 and an operating element 59 are connected to the InterBus-S.

All items of equipment which can communicate with each other together form a logic network. A prerequisite for a communication relationship between items of equipment in a logic network, besides the physical connection, is primarily a common communication protocol.

As its communication protocol the Ethernet 17 uses the TSP-IP-protocol by way of which the PC 15, the work station 20, the industry-PC 25 and the interbus connecting unit 30 can communicate with each other.

The following functions are generally supported by the TCP/IP-protocol by way of the Ethernet 17:

a) down-loading control programs and configuration data by way of the Ethernet on to the INTERBUS connecting cards 40, 42 of the industry-PC or the connecting unit 30 with Ethernet interface, b) archiving of programs and parameter sets in the work station 20, c) diagnosis of the connected field buses 44, 50 and 52, and d) transmission of visualisation data by way of the Ethernet.

The interbus 44, 54 or 52, besides a process data channel, uses a parameter channel for the transmission of data. Complex and more extensive data can be transmitted between two interbus subscribers, by way of the parameter channel. That channel is used in particular in order for example to up-date the displays of the operating terminals, or in order to transmit control programs on to the subordinate control device 50 by way of the interbus 44. The communication protocol which is used for data transmission by way of the parameter data channel of the interbus is referred to as the Peripheral Communication Protocol (PCP).

Figure 2:
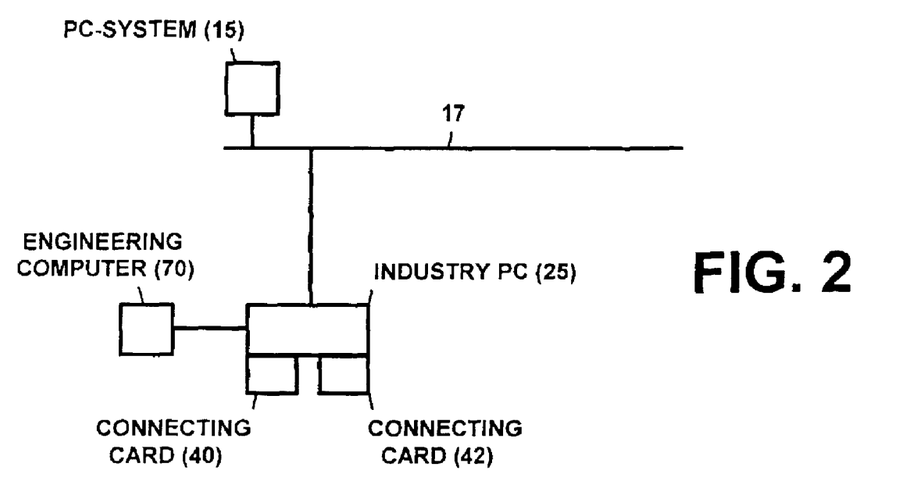
FIG. 2 shows a control device according to the invention as illustrated in FIG. 1, which connects two subordinate field buses to the Ethernet.

FIG. 2 shows a portion from the scenerio illustrated in FIG. 1. The industry-PC 25 which in this operates as a control computer is connected by way of the Ethernet 17 to the higher-order computer system 15. An engineering computer 70 which is illustrated here in stylised form as a laptop implements a connection to the industry-PC 25 by way of a serial connection (V24). Control of the interbuses 44 and 46 is translated by means of the two different PC-connecting cards 40 and 42 in the control computer 25. The PC-connecting card 40 may be for example the IBS ISA FC/I-T and the PC-connecting card 42 may be the IBS ISA FC/486 DX/I-T with a co-processor. In addition the industry-PC 25, besides the mass storage devices which are present as standard, includes a (PCMCIA) PC-card as a storage medium for all control programs and the essential configuration data for example for visualisation.

The unitary communication structure according to the invention based on TCP/IP substantially simplifies the following data transmissions:

down-loading and up-loading of control programs, the transmission of configuration data for controls and visualisation operations, the transmission of diagnosis data, and the transmission of data to the display device of the operating terminals.

Figure 3:
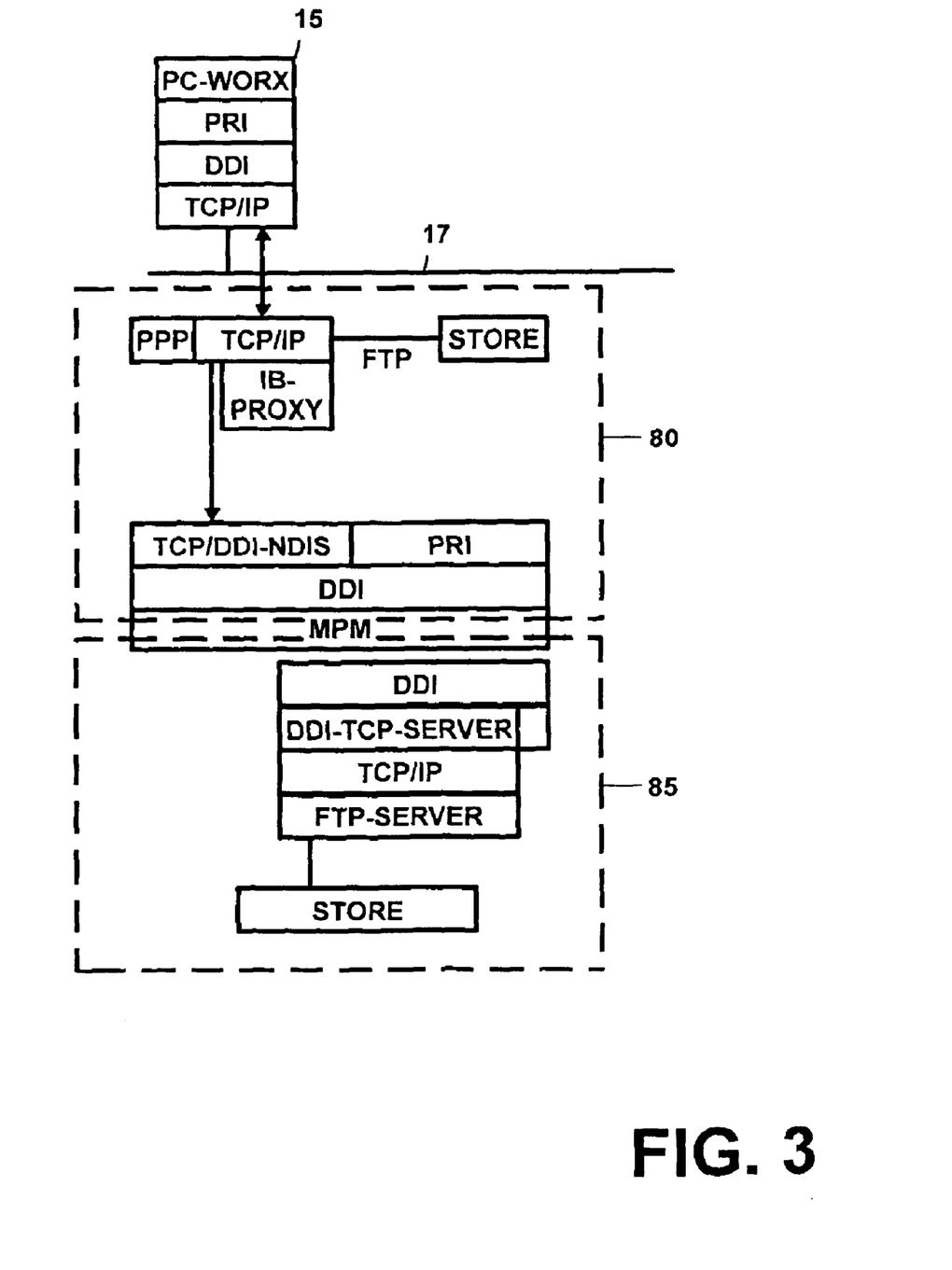
FIG. 3 shows the software structure of the control device shown in FIG. 2.

The software structure described hereinafter with reference to FIG. 3 is necessary on the industry-PC 25 in order to support the TCP/IP-communication structure according to the invention.

In order to clearly illustrate the communication between the industry-PC 25 and the higher PC 15, it is also illustrated in FIG. 3. The engineering computer 70 is not shown. In terms of communication procedure however it behaves like the industry-PC 25, with the difference that in this example a connection is made between the industry-PC 25 and the engineering computer 70 by way of the serial interface.

The higher-order PC 15 is diagrammatically shown in the upper region of FIG. 3. PC-WORX can be used for example on that PC 15 in order to acquire diagnosis data from the subordinate industry-PC 25 or in order to visualise the subordinate interbuses 44, 52 and 54.

The software structure of the industry-PC 25 is shown in the middle region of FIG. 3. A communication on the basis of the TCP-IP-protocol can be made possible by way of the Ethernet network connection and/or by way of a serial interface of the main computer 80 of the industry-PC 25. The point-to-point protocol (PPP) is supported by way of the serial line. That protocol encapsulates the TCP/IP-protocol into a suitable form so that serial transmission (for example by way of a modem) is possible.

A visualisation procedure can run on the industry-PC 25, which suitably accesses data of the procedure for example by way of the Open Con Interface (OCI). If those data are to be transmitted to a higher-order visualisation computer which is connected to the Ethernet 17, a server process (Ethernet-DDI-server, not shown) must run on the industry-PC 25, which passes the DDI-commands received by way of the Ethernet 17, to the device driver interface DDI. SYSTEM WORX is capable of transmitting DDI-services by datagram by way of the Ethernet 17. By way of that path, visualisation of the PC WORXremote can also be supplied with data. Control programs and the necessary configuration data can be down-loaded on to the connecting cards 40, 42 by way of a loader. It will be appreciated that this operation cannot be initiated by a remote host.

Down-loads and up-loads of data can be implemented in the TCP/IP-based Ethernet by means of the FTP-service. As that service provides a client/server structure, an FTP-server must always be available on the target system. Data can then be transmitted by means of a FTP-client to and from the industry-PC 25. In terms of standard Windows NT offers an FTP-client which is integrated in the system. By means of the FTP-service, control programs can be very comfortably down-loaded on to the industry-PC. In that situation the FTP-server uses the data file system (or a PC-card) of the industry-PC in order to store the received data. From there an IB-loader can be used in order to transfer the programs on to the connecting cards 40, 42. In order to provide a communication structure which is as unitary and universal as possible, in the entire automation system 10, control programs and configuration data must be down-loaded with the FTP-service on to the PC-connecting cards 40, 42. The matching operations which are necessary for that purpose are dependent on the subordinate PC-connecting card 40, 42.

The connecting card 42 shown in FIG. 3, with a co-processor 85, like the IBS ISA FC/486 DXfl-T or the IBS S7/400 DSC/ETH, affords the possibility of implementing its own TCP/IP-protocol stack and thus it also has its own IP-address with which it can be clearly identified in the automation system 10. If the co-processor 85 does not have an Ethernet connection, the sole interface which connects the co-processor 85 to the higher-order main computer 80 is a multi-port memory MPM. Therefore all data transferred by way of the FTP-service must be transmitted by way of the MPM. Those data must be acquired on the co-processor 85 by way of services of the DDI and converted again into TCP/IP-frames. That function is the subject of a special server process which runs on the co-processor 85 under VxWorks. The data are then passed by way of the TCP/IP-protocol stack to an FTP-server which additionally runs an the co-processor 85. A special TCP/DDI-NDIS-driver must also be present on the main computer 80. Date which come by way of the Ethernet interface or by way of PPP from the serial interface and which are intended for the subordinate PC-connecting card 42 must be diverted (routed) directly on to that driver. It will be appreciated that this can be implemented only when suitable routing information is available in the industry-PC 25.

If in contrast the co-processor 85 of the connecting card 42 has an Ethernet connection, the TCP/IP-stack operating on that co-processor 85 takes over all those functions.

In contrast to the connecting card 42 with the co-processor 85 the simple connecting card 40 does not have sufficient resources to permit its own TCP/IP-protocol stack. As consequently it also cannot have an IP-address, a so-called proxy-server on the higher-order main computer must provide that the connecting card 40 in the automation system 10 can be addressed. Such a proxy-server performs the part of an FTP-server, receives the down-loaded data as a proxy in respect of the subordinate connecting card 40 and then transfers those data by way of the MPM by means of the services, which are required for that purpose, of an interbus master.

Figure 4:
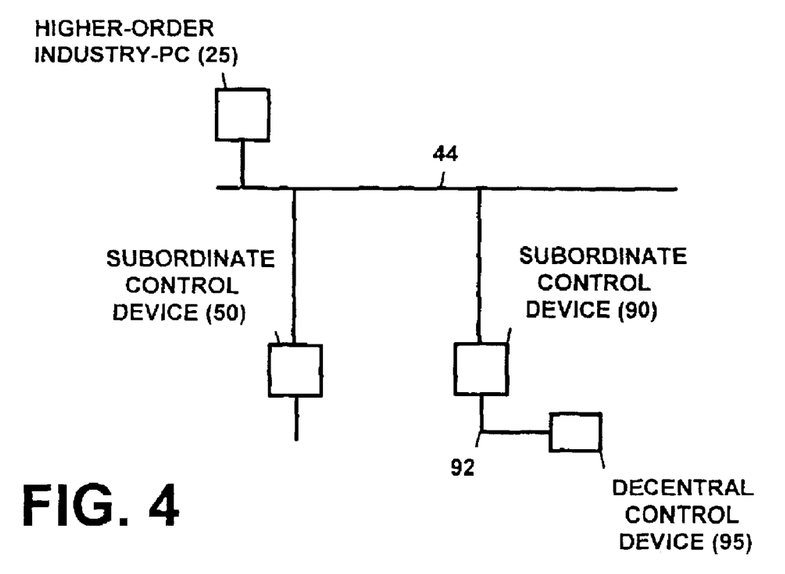
FIG. 4 shows the industry-PC illustrated in FIG. 1, which is connected by way of the interbus to two subordinate control devices.

FIG. 4 shows a portion of the automation system 10 illustrated in FIG. 1, in which the higher-order industry-PC 25 is connected by way of the interbus 44 to the subordinate control device 50 and a further subordinate control device 90. The directly subordinate control devices 50 and 90 are for example a remote field controller RFC (IBS 24RFC/486DX) and on the other hand a control-PC 90 with an interbus-PC-connecting unit. The subordinate control-PC 90 controls an interbus 92 into which in turn a decentral control device 95 (IBS RT 24 DIO 16/16-T) is integrated as a slave.

Control programs and configuration data are to be down-loaded on to the subordinate control devices 50, 90 by means of the FTP-service from the higher-order industry-PC 25 by way of the interbus 44. Transmission of the TCP/IP-data blocks by way of the interbus 44 is necessary for that purpose. So that interbus subscribers can be directly addressed by way of the TCP/IP-service FTP, they must have an IP-address. The control devices 50 and 90 have sufficient resources to permit their own full-value TCP/IP-protocol stack with which an IP-address can be associated.

As the interbus 44 functions as a transmission medium between the higher-order industry-PC 25 and the subordinate control devices 50 and 90, access to the control devices 50, 90 cannot be implemented with the standard processes which are self-evident in the Ethernet 17. In that respect a gateway between the Ethernet 17 and the interbus 44 must provide that the connection occurs. It must be possible to call up the IP-addresses of all interbus subscribers in a name server which is of higher order than the interbus 44. As the interbus subscribers are not regular Ethernet devices, the name server must also include the control computers which are responsible for the respective interbus subscriber. In other words, stored in the name server is the IP-address for example of the control device 50 and that of the identification device 58 and the operating terminal 59. TCP/IP-services which are directed for example to the subscriber 58 of the interbus 52 firstly go to the relevant proxy-server of the control device 50. The IP-address is then reproduced on to an interbus-specific communication reference with which there is described a connection between two interbus subscribers, by way of the parameter data channel. The received TCP/IP-data blocks are then enclosed in PPP-frames and transmitted by means of a sequence of PCP-service calls (fragmentation of the data) to the corresponding interbus subscriber 58. The transmission of the data can be effected either by the proxy-server itself or with a suitable PPP/PCP-NDIS-driver in the control device 50.

A driver or server process must be present on the subordinate control device 50 and 90, and by way of the interbus slave connection has access to the parameter data channel. That driver converts the PCP-frames into TCP/IP-frames (or PPP-frames respectively) again. The data then go for example to an FTP-server by way of the TCP/IP-protocol stack. The result of the service call-up is delivered back from the interbus subscriber by way of the parameter data channel either by way of the driver or directly to the proxy-server of the corresponding control device which is functioning as a gateway. From there the data are then transmitted to the calling system.

The transmission of data to a simple decentral control device (not shown) which does not have adequate resources to permit a TCP/IP-protocol stack is again possible by way of the proxy-server on the respective control device. As the subordinate control device is not TCP/IP-capable, a virtual IP-address must be associated therewith. Like also all real IP-addresses, the virtual IP-address must be clear in the entire automation system 10 and managed from the central name server. Down-loading of control programs from a higher-order control device by way of the TCP/IP-service FTP is converted by way of the proxy-server. The FTP-service call-up is processed by the proxy-server, as being representative in respect of the subordinate control device. By way of the reproduction of the virtual IP-address on to the communication reference, the proxy-server determines the correct interbus subscriber and emulates the FTP-service by using the appropriate interbus service call-ups (DDI) which are necessary for down-loading of the software on to the circuit or connection. The results of the down-loading operation are passed back to the FTP-client by way of the proxy-server in suitable form (FTP-conforming).

Figure 5:
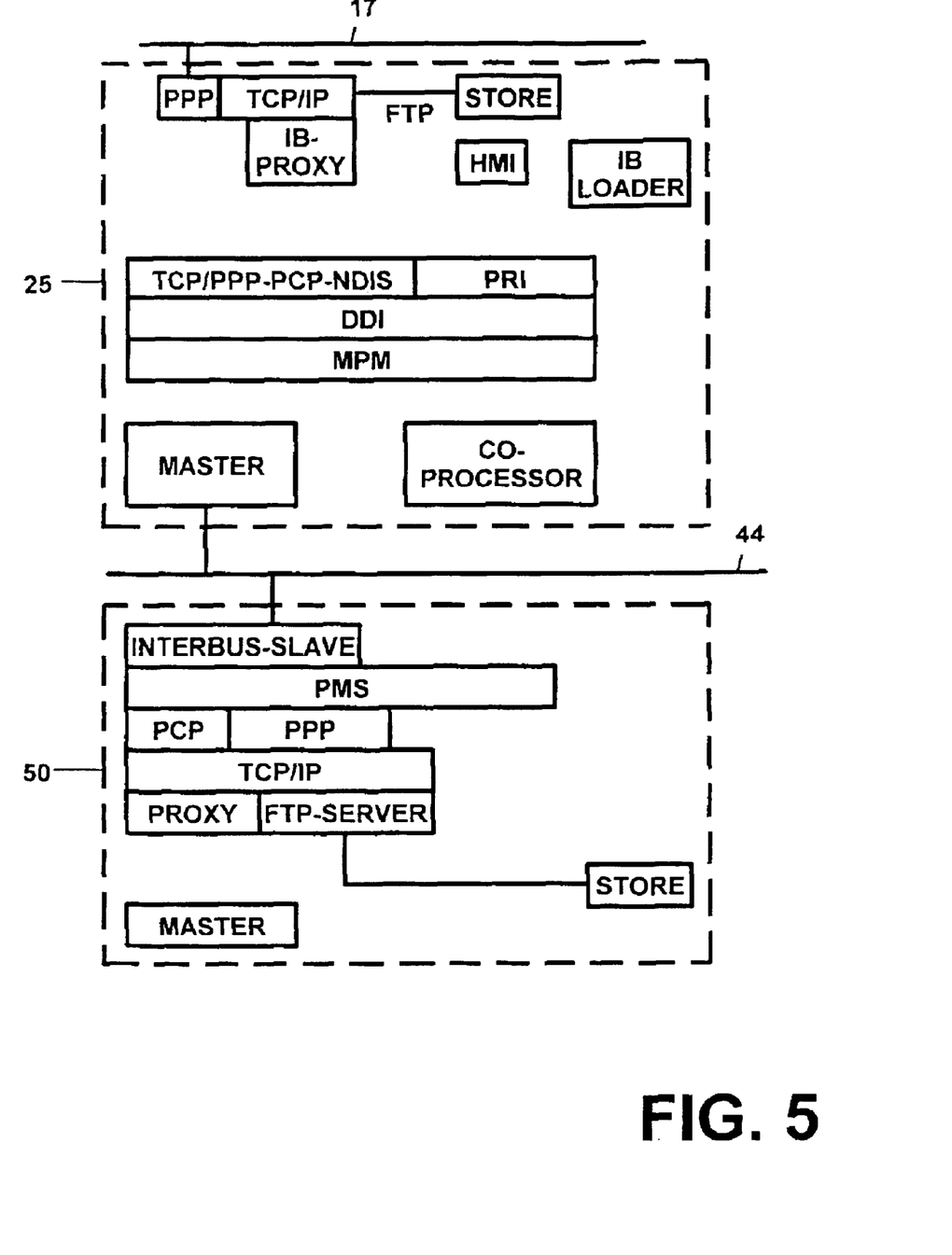
FIG. 5 shows the software structure on the industry-PC and a subordinate control device as shown in FIG. 4, which are connected by way of an interbus.

FIG. 5 shows the broad outlines of the software structure for the industry-PC 25 functioning as a gateway and the higher-order control device 50 of the type IBS 24 RFC/DX 486 with the TCP/IP-protocol stack.

If the subordinate control device 50 is a PC-based control device which controls the subordinate interbus 52, then there are at least two interbus connections in that system. The control device 50 is connected to the higher-order interbus 44 by way of a slave connection. Control of the subordinate interbus 52 is implemented by a master connection. The data received by way of the parameter data channel of the interbus 44 are converted by way of a PCP/PP-NDIS-driver into PPP-frames again and are passed by way of the TCP/IP-protocol stack for example to the FTP-server.

So that data can also be transported to subordinate interbuses by way of a plurality of control devices—for example the control devices 25 and 50—which function as gateways, there must be an interbus proxy-server on each gateway which connects two interbuses and which supports TCP/IP or TCP/IP by way of PCP. The proxy-server manages all subordinate interbus subscribers which support PCP. So that these subscribers can be addressed with a TCP/IP-service, the proxy-server must know the IP-addresses of the subordinate subscribers and be able to reproduce them on to an interbus-specific communication reference. The proxy-server uses simple name tables in order to address subordinate control devices and interbus subscribers by way of the interbus with TCP/IP-services such as FTP. Communication with higher-order control devices is only possible when the subordinate control device knows about the way in which higher-order control devices are to be reached (by way of which gateways etc).

In an interbus the connection to the higher-order gateway is basically achieved by way of the master connection of the corresponding interbus sub-network. The directly superior gateway can thus be addressed by subordinate bus subscribers without any problem. Connections to superior or higher-order systems by way of a plurality of gateways are only possible when the respective subscriber has knowledge of the necessary route. In a more meaningful fashion, the logic necessary for that purpose is shifted into the proxy-server which is necessary on each gateway. As the proxy-server has knowledge about the addresses of all the subordinate interbus subscribers and the address of the next higher-order gateway, services which go to other IP-addresses are basically passed to the next gateway until the relevant control device is found. On the level of the Ethernet the special name server which manages all the IP-addresses of the automation system provides that all IP-addresses (including the virtual addresses) are resolved or that the correct routes are identified.

An essential prerequisite for the integration of field bus subscribers into a communication structure based on TCP/IP is on the one hand the physical connection between network and subscriber and on the other hand the clear IP-address of the respective subscriber in the network. The physical connection between the different transmission media (such as for example Ethernet and interbus) can be converted by way of gateways, as already described. This can be implemented either by PC-based control devices with a network card and interbus connections, or Ethernet-RFC(IBS 24 RFC/486DX/ETH-T). The connection between a higher-order and a subordinate interbus is also converted by means of control devices functioning as gateways, although both physical transmission media are identical. Gateways are in the automationsystem 10 basically control devices which control a subordinate field bus. Depending on the nature of the subordinate field bus subscriber data transmissions (such as down-loads and up-loads) between gateway and same occur either by way of

TCP/IP,

TCP/IP by way of PCP (PCP+), or

PCP.

Control devices which do not have their own TCP/IP-protocol stack must be capable of being addressed by way of virtual IP-addresses. The gateway must convert a corresponding name association as the 'proxy' or 'representative' of the subordinate bus subscriber. By way of the connecting unit of the gateway it is possible to define communication references with which PCP-connections between two PCP-capable bus subscribers are characterised. In principle a PCP-communication to each bus subscriber with PCP-capability can be made up by way of the connecting unit. A clear IP-address can be associated with a bus subscriber by means of a suitable reproduction function from communication reference on to virtual IP. That reproduction operation is managed in a higher-order or superior name server and on the respective gateway computer.

Essentially three software components must be converted for implementation of this structure:

Interbus-proxy-clients for all computer systems which are disposed directly in the network, Interbus-proxy-server for the corresponding gateway computers, PCP/PPP-NDIS-driver for PC-based computer systems which are connected by way of a slave connection to the interbus and thus to the gateway, PCP/PPP-server-process for decentral controls such as the IBS 24 RFC/486DX.

Interbus-proxy-clients must distinguish between real and virtual IPs. Most TCP/IP-services such as Telnet, Ping or FTP require the statement of an IP-address which characterises which host is to be addressed. Under Windows NT and in many other operating systems, a specific software library (referred to as a socketlibrary) is used in order to be able to perform network-specific functions such as connection formation, data transmissions and name resolution. As all TCP/IP-standard services use that library, the proxy-client, before call-up of the functions of the actual socketlibrary, must still check the called-up IP-address in order to test whether this involves a virtual or a real IP. In the case of a real IP-address all function call-ups can be passed to the socketlibrary. In contrast thereto, in the case of a virtual IP-address, the service must be passed to an interbus-proxy-server as the selected item of equipment is a subscriber of the interbus and in this respect cannot be reached directly in the network. The proxy-client can ascertain the competent proxy-server either by way of a local or a central reproduction table in a databank (name server). That table contains all virtual IP-addresses associated with a proxy-server.

Besides the use of virtual IP-addresses, there is also the possibility of associating a plurality of IP-addresses with a network card. In that case a gateway computer could reproduce all IP-addresses of the subordinate interbus subscribers on to its own network card. In this case central name management and the proxy-client are superfluous. Each TCP/IP-service which is called up with an IP-address of the subordinate interbus subscribers must be intercepted on the gateway computer and re-transmitted to the subordinate interbus subscriber. Each call-up of a TCP/IP-service is analysed by the proxy-server. If in that case the defined IP-address of a subordinate interbus subscriber is found, the call-up is enclosed in the PPP-frame and transmitted to the competent receiver by means of the corresponding interbus services by way of the parameter data channel. A disadvantage of this approach is the amount of IP-addresses which are simultaneously bound to the network card. At the present time only five different IP-addresses are supported by Windows NT.

The interbus-proxy-server runs on gateway computers and is responsible for the TCP/IP-based communication between systems by way of the interbus. The following belong to the functions of the proxy-server:

Producing and managing virtual 'PPP by way of PCP'-connections to subordinate and superior or higher-order systems, Emulation of TCP/IP-services being representative in respect of interbus subscribers without a TCP/IP-protocol stack, Preparation of the 'Remote-DDI' for configuration and visualisation, Management of local name tables with virtual IP-addresses of subordinate systems, Synchronisation of the local and global name entries, and Routing.

The proxy-server manages all connections between subordinate and superior systems. In order to guarantee an adequate degree of flexibility the proxy-server must be able to manage a plurality of simultaneous connections. As connections are also to be made by way of a plurality of planes or levels (and accordingly a plurality of gateways), the proxy-server must also be able to ascertain the path to a given IP-address. The route to a given subordinate subscriber can be found by way of the use of static routing tables in which all subordinate systems are recorded in suitable form. The route to a superior or higher-order system can only be established by a message exchange with superior gateways. Thus under some circumstances the connection must be implemented by way of a plurality of gateways or proxy-servers thereof. Here proxy-servers function as software-routers. For that purpose also local name tables are controlled and managed by the proxy-server. As the proxy-server is competent for control of the tables, the local data must additionally be co-ordinated or matched with the global data of the global name server.

For bus subscribers without the possibility of their own TCP/IP-protocol stack proxy-servers must also emulate the essential TCP/IP-services. In this case, in a meaningful fashion, a suitable selection of available emulation services must be affected. In addition the proxy-server should function as an Ethernet DDI-server so that configuration tools and visualisation operations can 'remotely' access the DDI.

The interbus-proxy-client is basically automatically active before each call-up of a socket function. If that call-up is a function which for the sake of argument includes an IP-address, the proxy-client checks same. If the proxy-client finds a real IP-address, the call-up is passed directly to the appropriate socket function. If a virtual IP-address is found, the function call-up is put into a datagram and sent to the appropriate proxy-server. The result of the function call-up then comes either directly from the real host or however from the proxy-server in the form of a datagram. The communication between proxy-client and proxy-server is typically implemented by way of remote procedure calls.

PC-controls which are connected to an interbus by way of a slave connection require an NDIS-driver which, from the PCP-data received by way of the interbus, again produces PPP-frames (and conversely, from PPP-frames, again PCP-frames). Data which come from the interbus connecting unit must be converted by the driver into PPP-data packets. As the PCP-protocol can only transmit small amounts of data in a service call, under some circumstances defragmentation of the data must be effected. In addition provision must be made for fault processing, in the event of incomplete data. In the other direction, received PPP-data packets have to be fragmented and transmitted by way of a sequence of PCP-service calls.

As a TCP/IP protocol stack is possible on PC-connecting cards with co-processor, the protocol TCP/IP should additionally be taken by way of the multi-port memory. That would also make it possible for processes which are active under VxWorks on a co-processor board to be 'remotely' debugged by way of TCP/IP. In that respect an NDIS-driver is necessary, which behaves in relation to the host like a network card and which on the other hand accesses the mailbox interface of the MPM by way of the DDI.

The configuration of an automation system can be markedly simplified by the use of a unitary communication plane or level. The use of the de facto standard TCP/IP means that it is possible to have recourse to a large quantity of useful software tools.

The file transfer protocol (ftp) can be used for the transmission of large amounts of data. Down-loads and up-loads of programs and configuration data can thus be implemented in a unitary fashion. Substantial automation can be considerably simplified by such a transparent communication structure.

Extensive automation systems include a large number of different decentral controls. Frequently, in large installations, autarchic units have to be exchanged or re-initialised. Those components then have to be started up again automatically as far as possible. In PC-based control devices and remote field control devices, control programs and other configuration data can be stored on a PC-card (flash memory, ATA drive etc, see also Appendix A). During the booting procedure all data can be down-loaded again from those storage media by way of the FTP-service on to the subordinate controls.

Monitoring of the automation system is also supported by the use of the TCP/IP-protocol. Starting from simple monitoring by way of complex remote maintenance options, many areas of use can be covered on the basis of TCP/IP. For example, the simple Ping service can be used in order to check whether a system is present in the network. Many more options are afforded by the Simple Network Management Protocol. That protocol forms the basis for many modern network management applications.

The use of the TCP/IP-protocol for implementation of a unitary communication infrastructure in an automation system affords a series of advantages. The increasing degree of complexity due to ever increasingly decentral, autarchic functional units, can be counteracted by virtue of transparency of the communication. Start-up, maintenance operations and adaptations in the system can be considerably simplified. Mechanisms which are already tried and tested for the transmission of data, remote maintenance etc can be used over a wide area. A large number of available software tools on the basis of the TCP/IP-protocol make many special solutions redundant. As already mentioned for example control programs and other data can be down-loaded without any problem with the FTP-service, it is possible to maintain any functional units on the basis of SNMP and it is possible to remote-start system processes with rexec.

What is claimed is:

1. An automation system comprising:
a first physical network (17) using a first communication protocol, at least one device connected to said first physical network (17),
at least one second physical network (46, 52; 54) using a second communication protocol, said at least one second physical network connected to said first physical network by way of a first control device (25; 30) functioning as a gateway, at least one device connected to said at least one second physical network wherein said first physical network and said second physical network (17; 46, 52, 54) and said first communication protocol and said second communication protocol are different from each other,
the first network is a routing network and the second network is a field bus,
said first control device having a logic interface adapted for transparent data communication using said first communication protocol between at least one device (15, 20, 25, 30) connected to the first physical network (17) and at least one device (50, 58, 59; 54, 56, 57, 60) connected to the second physical network (46, 52, 54), wherein said transparent data communication consists of a subscriber connected to the second physical network (field bus) using the second communication protocol being adapted to process (understand) data coming from a subscriber connected to the first physical network using the first communication protocol so as to allow a person looking from outside the system to get an impression that there exists a connection via a homogenous network between the subscriber connected to the first physical network and the subscriber connected to the second physical network,
said control device includes a memory device forte storage in particular of control programs, diagnosis data relating to the respective second network, and configuration data,
said control device has a memory in which the IP-addresses of higher-order and/or subordinate control device and devices which are connected to at least one second network are stored,
associated with the system is a device which can be called up, for the storage of the IP-addresses and/or virtual IP-addresses of all devices connected to the first and each second network, and the first and second control devices,
data communication using a common protocol is permitted by way of the routing network and all field buses connected to the first and second networks,
a specific server to transmit data in the first communication protocol
all subscribers communicate with each other by using a TCP/IP-protocol regardless of whether they are connected directly to the first physical network using the TCP/IP-protocol or to the field bus using a separate communication protocol,
field bus subscribers are integrated into a communication structure using a common communication protocol,
control programs and configuration data are down-loaded onto the subordinate control devices (50, 90) by means of FTP-service from the higher-order industry-PC by way of the interbus (44) transmission of TCP/IP-data blocks by way of the interbus (44),
interbus subscribers have IP-addresses, respectively, so as to allow interbus subscribers to be directly addressed by way of TCP/IP-service FTP,
a respective subscriber in the network has a clear IP-address for integration of the field bus subscribers into a communication structure based on TCP/IP,
the first physical network is the Ethernet,
logic interfaces of the control device and the second control device are respectively designed for conversion of a data block in accordance with the TCP/IP-protocol into a data block in accordance with the second communication protocol, in particular the PCP (Peripheral Communication Protocol)-protocol.

2. The control device for use in an automation system according to claim 1 which connects at least one second physical network to a first physical network (17), said at least one second network being subordinate to said first physical network, in which all connected devices (15, 20, 25, 30) connected to said first physical network can communicate on the basis of a first communication protocol, wherein all devices connected to said at least one second network can communicate on the basis of a second communication protocol, wherein said first physical network and said second physical network (17; 46, 52, 54) and said first communication protocol and said second communication protocol are different from each other, wherein the first network is a routing network and the second network is a filed bus, said control device having a logic interface adapted for substantially transparent communication of data based on said first communication protocol between at least one device (15, 20, 25, 30) connected to said first network (17) and at least one device (50, 58, 59; 54, 56, 57, 60) connected to said at least one second network (46, 52, 54), said control device has a memory in which IP-addresses of predetermined high-order and/or subordinate control device and predetermined device which are connected to said second network are stored.

3. The automation system according to claim 1, wherein the routing network is the Ethernet, the field bus is an Interbus-5 in accordance with DIN 19258, and the first communication protocol is the TCP/IP-protocol.

4. The automation system according to claim 1, wherein at least one second control device (50) functions as a gateway and by way of which at least two second networks (44, 52) can be connected together, wherein the second control device (50) has a logic interface for the substantially transparent communication by way of the second networks (46, 52) on the basis of the first communication protocol.

5. The automation system according to claim 1, wherein the logic interface of the first control device includes an OCI (Open Corn Interface)-interface, a DDI (Device Driver Interface)-server, and a DDI-interface for receiving and processing DDI-commands received by way of the first network.

6. The automation system according to claim 1, wherein the logic interface of the first and second control devices includes an FTP (Pile Transmission Protocol)-server and -client for receiving and transmitting data, in particular control programs and configuration data, and an MPM (Multi Port Memory)-store.

7. The automation system according to claim 1 wherein an IP-address is associated with each control device.

8. The automation system according to claim 1 or 6, wherein at least one of the first and second control devices is adapted to receive at least one connecting card for the connection of a second network, wherein the connecting card includes a co-processor on which the logic interface is implemented, an IP-address is associated with each connecting card.

9. The automation system according to claim 1 or 6, wherein at least one of the first and second control devices is adapted to receive at least one connecting card, that the logic interface is implemented on a proxy-server which is associated with the respective control device and which manages at least the virtual IP-address of the respective connecting card.

* * * * *